United States Patent Office

3,553,123
Patented Jan. 5, 1971

3,553,123
ONE-STEP CLEAN AND POLISH COMPOSITION
John M. Behnke, Newark, N.J., assignor to Bristol-Myers Company, New York, N.Y., a corporation of Delaware
No Drawing. Filed Apr. 6, 1967, Ser. No. 628,817
Int. Cl. C09g 1/04
U.S. Cl. 260—23          4 Claims

ABSTRACT OF THE DISCLOSURE

A composition used for cleaning and polishing surfaces, particularly wood surfaces in a one-step application. The composition is prepared as an oil-in-water emulsion which inverts into a water-in-oil emulsion upon application and rubbing. The ingredients are wax, emulsifiers, resins, water, solvent, and fragrances in certain critical proportions.

---

This invention relates to a one-step clean and polish composition for surfaces. Specifically the invention is concerned with wood surfaces which are floors. However, the invention is not limited to the application of said polish to wood floors. Included within the scope of the present invention are furniture, Formica surfaces and a variety of floor tiles, except asphalt tile. Thus the composition provides surface protection and also acts as a rejuvenator of old and second-hand furniture. One important aspect of the present invention is the provision of a dry-bright gloss on Formica surfaces.

In compositions designed to clean and polish wood floors and the like in one step, in addition to the shine producing agent, it is desirable to have water present therein. This is important because of the cleaning action that the water will contribute to this composition particularly with regard to water soluble or water suspendible dirt. However, since prolonged contact of water with the wood surface has a deleterious effect on the wood it is necessary to provide some means for limiting the contact time of the water on the surface. It has now been found that this can be accomplished by providing an oil-in-water emulsion cleaning and polishing composition which when applied to the surface will remove dirt and when rubbed will invert to a water-in-oil emulsion.

It is accordingly an object of the present invention to provide a water-containing one-step clean and polish composition which may be applied to wood surfaces and the like while avoiding the deleterious effect of such water on the surface treated.

It is another object to provide a composition capable of simultaneously giving the surface to be protected a good gloss in addition to a sealing effect affording protection against the penetration of water, ink, alcoholic beverages and the like.

A further object is to provide a composition capable of giving furniture and floor surfaces a film having good hardness, excellent toughness and gloss, as well as good traffic resistance.

A further object is to provide a composition which can be used to clean surfaces and produce a dry-bright gloss simultaneously in a one-step application.

Protective wax coatings have been applied to furniture and floor surfaces to not only protect them against dirt and moisture but to impart an attractive and lustrous appearance. These coatings have been employed in such forms as aqueous dispersions and solvent-containing pastes. Some wax compositions are of the "self-polishing" type being applied as a suspension of wax in a carrier such as water and dry to give a polished appearance without further rubbing. Prior art compositions have included certain adjuvants in the wax dispersions which are known as extenders or modifiers. Such materials as natural and synthetic resins for example manila gum or polymeric alkyl-modified esters of rosin have been used. Unfortunately, many of these prior art compositions while presenting a polished appearance have been poor in their resistance to slipping. Improvements have been made in these formulations by the incorporation of materials which improve the resistance to slipping, but also result in some loss in luster.

Many combinations of ingredients prepared in various forms have resulted from efforts to improve the over-all characteristics of wax compositions. Emulsions have been prepared wherein phase inversion occurs during the preparation of the emulsion. Some fairly complex emulsions have been prepared which are self-spraying and undergo phase inversion upon spraying due to the decrease in pressure and evaporation of the gases of the aerosol. Depending on many factors such as the degree of stability, the type of emulsion, the cost of the ingredients, ease of preparation, and the particular purpose for a proposed system, the possible choices of emulsifiers and compatible ingredients are many. It is well known that many systems may utilize a mixture of emulsifiers, tailored to meet specific needs. As far as the inventor knows, none of these earlier wax compositions undergoes inversion upon application and rub-out, as do the emulsions of this invention.

The objectives of this invention are accomplished by providing a system which is initially an oil-in-water emulsion but which when applied to the wood surface and rubbed is quickly converted into a water-in-oil emulsion. Thus on the initial application of the polish to the wood surface, water is available for cleaning purposes. However, as soon as the polish is rubbed into the wood surface, the emulsion inverts and the oil becomes the continuous phase. At this point the water is no longer available for contacting the wood surface. The application of the emulsion yields a non-buffable, dry-bright gloss in conjunction with a very pronounced cleaning effect.

It has been found that the new product is equally effective on wooden floors, old furniture, Formica surfaces and on a variety of floor tiles, except asphalt tile. The emulsion acts as a cleaning agent which also produces a high gloss and waterproofing or sealing effect on capillary surface fissures of the substrate. It has been found that even on rather worn wood surfaces the composition does not penetrate into the substrate and is devoid of the very undesirable "wicking" effect on surfaces which had been previously treated with silicone preparations.

The clean and polish compositions of the present invention are comprised of a coating material, an emulsifier system, a solvent for the coating material, and water. The coating material may be comprised of a resin system or a resin system and a wax. The expressions "emulsifier system" and "resin system" are used to indicate that more than one emulsifier and resin are present. Thus the emulsifier system is comprised of an anionic and a non-ionic emulsifier and the resin system is comprised of an ester of terpene and phenol and a copolymer of an ester of acrylic and methacrylic acid. It has been found quite unexpectedly that if the relative quantities of the emulsifier and resin systems are controlled within certain limits and the HLB value of the non-ionic emulsifier of the emulsifier system is at least 13.0, the emulsion will be stable on storage but will change from an oil-in-water emulsion upon application and rubbing to a water-in-oil emulsion. It is important that the emulsifier system be soluble in water and in the hydrocarbon solvent. It is equally important that the resin system and the wax be soluble in the solvent.

The one-step clean and polish emulsions which are the subject of this invention represent a vast improvement in the art. By the selection of a combination of ingredients in certain proportions it is now possible to clean both water-soluble and oil-soluble dirt and at the same time provide to surfaces a lustrous and waterproof protective coating. Thus a surface spotted with fruit juices or catsup and edible fats or grease, for example, can be treated in a single application to remove these stains and simultaneously provide an attractive protective coating. It is also possible as a result of this invention to readily provide a protective coating for Formica surfaces, heretofore difficult or impossible to obtain.

Extensive experimentation covering many materials was necessary before this versatile system was developed. It is clear then that the unexpected result of phase inversion upon application and rubbing which makes it possible to clean both water-soluble and oil-soluble dirt in a single application could not have been predicted from a mere knowledge of the properties of the ingredients chosen. Moreover, it has been found that, for example, if too little of the emulsifier system is present no emulsion will result, whereas if too much is present the emulsion would be so stable that no inversion would occur on rubbing. It is also noteworthy that the composition is prepared in two steps. A water-in-oil emulsion is first prepared, homogenized and inversion effected into an oil-in-water emulsion. If one were to start with an oil-in-water emulsion a greater quantity of emulsifier would be necessary, which would prevent inversion on rub-out.

The HLB value is an expression of the hydrophile-lipophile balance, i.e. the balance of the size and strength of the hydrophilic (water-loving or polar) and the lipophilic (oil-loving or non-polar) groups present. Thus a system that is lipophilic in character is generally assigned a number below 9.0 and one that is hydrophilic would have a number above 11.0. A system which is intermediate would have a value between 9 and 11. It is an important and necessary feature of the present invention that the non-ionic emulsifier have a minimum HLB value of 13.0. While the combination of emulsifiers is known in the art the combination of the anionic and non-ionic emulsifiers of this invention wherein the non-ionic emulsifier has an HLB value of 13.0 or greater with the attendant inversion on application and rub-out is new. If an emulsifier with an HLB value less than 13.0 were to be used a very unstable emulsion or no emulsion would be the result.

The waxes preferably employed in the emulsions of the present invention are of the synthetic type and are polyvinyl ether hardwaxes. These are polyvinyl higher fatty alcohol ethers having 12–18 carbons in the fatty alcohol chain. The waxes contemplated have a melting point between 45–55° C. One such wax is known as Hoechst Wax V, which is polyvinyl octadecyl ether. The amount of wax may vary depending on the degree of shine and other properties desired, but amounts up to 1.0% by weight and greater are usable with 0.2–0.5% being the preferred range.

The emulsifier system is comprised of a mixture of anionic and non-ionic emulsifiers. The anionic emulsifier is formed from the combination of a volatile amine such as diethylethanolamine, dimethylethanolamine, 3-methoxy-n-propylamine, and morpholine with saturated and unsaturated fatty acids of the class $C_nH_{2n+1}COOH$ and $C_nH_{2n-1}COOH$ respectively, having 12–18 carbons such as lauric acid, stearic acid, isostearic acid and oleic acid.

The non-ionic emulsifier is a polyoxyethylene aliphatic ether which is in effect a non-ionic synthetic detergent which is soluble in water and oil. These compounds, which are polyoxyethylene ethers of highly branched chain saturated 11–15 carbon atom acyclic alcohols wherein the ethers contain an average of 10 to 20 oxyethylene groups per mole, and their preparation, are disclosed in the patent to Barker (U.S. 2,934,568) the disclosure of which is herein incorporated by reference. A preferred non-ionic emulsifier included in the Barker patent is known as Renex–30 which is polyoxyethylene-12-tridecylether. The emulsifier ingredients may vary according to the following table:

TABLE 1

| Ingredient: | Weight percent |
| --- | --- |
| Amine | 0.05–1.00 |
| Fatty acid | 0.15–2.00 |
| Non-ionic emulsifier | 0.60–3.25 |

The following table illustrates the preferred ranges of these ingredients:

TABLE 2

| Ingredient: | Weight percent |
| --- | --- |
| Amine | 0.10–0.50 |
| Fatty acid | 0.25–1.50 |
| Non-ionic emulsifier | 0.75–3.00 |

The resin system is comprised of two types of resins. The first shall be referred to as Shanco Resins (300 Series). These resins are partially esterified esters of terpene and phenol having a melting point of 130–158° C. and an acid value of 40–70. The preferred resin known as Shanco Resin 300 is a partially esterified ester of terpene and phenol having a melting point of 149–152° C., and an acid value of 55–65, and a specific gravity of 1.08 at 20° C.

The second type resin is represented by the compounds disclosed in U.S. Pat. 2,744,884, the disclosure of which is herein incorporated by reference. These compounds are esters of acrylic and methacrylic acid and polymers and copolymers of these esters. A preferred resin in this class of compounds is a copolymer of N-tert-alkylaminoalkyl ester of acrylic and methacrylic acid, wherein the alkyl groups have a total of not over 23 carbon atoms, known as Acryloid B–67.

The amount of resins used may vary as shown in the following table:

TABLE 3

| Resin: | Weight percent |
| --- | --- |
| Shanco Resin 300 | 0.1–5.0 |
| Acryloid Resin B–67 | 5.0–9.0 |

The preferred ranges of these ingredients are given in the following table:

TABLE 4

| Resin: | Weight percent |
| --- | --- |
| Shanco Resin 300 | 0.5–3.0 |
| Acryloid Resin B–67 | 6.0–7.5 |

The class of solvents employed are petroleum distillates which ares saturated aliphatic hydrocarbons having a minimum Kauri-Butanol value of 36. The preferred solvent is one known as Amsco 46 Spirits which has a K–B value of 42.5, a specific gravity at 20° C. of .7972 and a flash point of 104° F. The solvent must be highly paraffinic, i.e. non-aromatic. It is an important feature of the present invention that the solvent has a minimum K–B value of 36 and that its rate of evaporation be less than that of water. The amount of solvent may vary according to the amounts of the other ingredients and according to the result desired.

Although deionized water is preferred ordinary tap water may also be used in preparing the emulsions of this invention. The amount of water employed will vary according to the amounts of the other ingredients and according to the results desired.

The fragrances, which are employed to mask the odor of solvent, are optional. Such fragrances as Concentrate 718–C and Pine Needle Bouquet No. 921 are desirable.

The preferred embodiment of this invention is given in Example 1.

PREPARATION OF THE COMPOSITIONS

The preparation of the compositions of this invention proceeds in two steps:

Step 1.—Preparation of an initial water-in-oil emulsion.
Step 2.—Homogenization and inversion simultaneously into an oil-in-water emulsion.

Step 1

All solids (i.e. the wax, Shanco and Acryloid Resins) are brought into a steam or hot-water jacketed kettle equipped with a stirrer of about 120–300 r.p.m., Amsco 46. Spirits are added and the batch is brought to about 160° F. When all materials are dissolved oleic acid, Renex-30, and morpholine are added and the mass is kept at this temperature under continuous stirring for about thirty minutes. Then the heat is turned off. Water at room temperature is now added in a small stream to the agitated solution. When mechanically possible it is recommended that a fast running propeller agitator be employed for this dispersion process, which produces a water-in-oil emulsion. During this dispersion step the fragrances Concentrate 718–C and Pine Needle Bouquet No. 921 are also added.

Step 2

The above prepared emulsion is now filtered and passed through a loaded spring valve type homogenizer, e.g. a Manton-Gaulin Homogenizer, at a pressure of about 3,000 pounds per square inch. The resultant composition is an oil-in-water emulsion.

For a fuller understanding of the nature and objects of the invention, reference should be made to the following examples which are presented as further illustrations of the invention but are not to be construed in a limiting sense.

All examples were prepared according to the procedure set forth above.

EXAMPLE 1

| Materials: | Weight percent |
|---|---|
| Hoechst Wax V | 0.20 |
| Morpholine | 0.50 |
| Oleic acid | 0.50 |
| Renex-30 | 1.50 |
| Shanco Resin (300) | 2.40 |
| Acryloid Resin (B–67) | 7.00 |
| Amsco 46 Spirits | 46.00 |
| Water | 41.70 |
| Concentrate 718–C fragrance | 0.10 |
| Pine Needle Bouquet No. 921 | 0.10 |
| | 100.00 |

This composition was used to clean and polish old tables made of walnut and mahogany wood. The top of a walnut table was covered with ordinary dirt in addition to being soiled with catsup and vegetable oil. The emulsion was applied to the surface and rubbed briefly to effect phase inversion. Upon drying the table top was clean of all dirt and had a lustrous polished appearance which was resistant to water staining. Similarly a mahogany table top soiled with ordinary dirt, coffee and mineral oil was treated with the emulsion and rubbed briefly. Upon drying a clean and polished surface resulted.

EXAMPLE 2

| Materials: | Weight percent |
|---|---|
| Hoechst Wax V | 0.20 |
| Morpholine | 0.10 |
| Oleic acid | 0.25 |
| Renex-30 | 0.75 |
| Shanco Resin (300) | 0.50 |
| Acryloid Resin (B–67) | 6.00 |
| Amsco 46 Spirits | 46.00 |
| Water | 46.00 |
| Concentrate 718–C fragrance | 0.10 |
| Pine Needle Bouquet No. 921 | 0.10 |
| | 100.00 |

The composition of Example 2 was used on a Formica [1] table top which was covered with ordinary dirt. The emulsion was applied and rubbed briefly to effect the phase inversion. Upon drying the surface had a clean and evenly polished appearance.

EXAMPLE 3

| Materials: | Weight percent |
|---|---|
| Hoechst Wax V | 0.50 |
| Morpholine | 0.50 |
| Oleic acid | 1.50 |
| Renex-30 | 3.00 |
| Shanco Resin (300) | 3.00 |
| Acryloid Resin (B–67) | 7.50 |
| Amsco 46 Spirits | 43.80 |
| Water | 40.00 |
| Concentrate 718–C fragrance | 0.10 |
| Pine Needle Bouquet No. 921 | 0.10 |
| | 100.00 |

The composition of Example 3 was used on an oak floor which was in need of cleaning. The emulsion was applied and rubber briefly. Upon drying the floor had a cleaned and polished appearance, which was resistant to slipping, traffic wear and water spotting.

EXAMPLE 4

| Materials: | Weight percent |
|---|---|
| Hoechst Wax V | 0.10 |
| Morpholine | 0.05 |
| Oleic acid | 0.15 |
| Renex-30 | 0.60 |
| Shanco Resin (300) | 0.10 |
| Acryloid Resin (B–67) | 5.00 |
| Amsco 46 Spirits | 50.00 |
| Water | 43.80 |
| Concentrate 718–C fragrance | 0.10 |
| Pine Needle Bouquet No. 921 | 0.10 |
| | 100.00 |

The composition of Example 4 was used as in Example 1 with the same results.

EXAMPLE 5

| Materials: | Weight percent |
|---|---|
| Hoechst Wax V | 1.00 |
| Morpholine | 1.00 |
| Oleic acid | 2.00 |
| Renex-30 | 3.25 |
| Shanco Resin (300) | 5.00 |
| Acryloid Resin (B–67) | 9.00 |
| Amsco 46 Spirits | 40.55 |
| Water | 38.00 |
| Concentrate 718–C fragrance | 0.10 |
| Pine Needle Bouquet No. 921 | 0.10 |
| | 100.00 |

[1] Formica is the registered trademark of the Formica Division of American Cyanamid Company for a laminated plastic comprising phenolic resin and melamine formaldehyde resin impregnated paper.

The composition of Example 5 was used as in Example 2 with the same results.

EXAMPLE 6

| Materials: | Weight percent |
|---|---|
| Hoechst Wax V | 0.20 |
| Dimethylethanolamine | 0.50 |
| Stearic acid | 0.50 |
| Renex-30 | 1.50 |
| Shanco Resin (300) | 2.40 |
| Acryloid Resin (B-67) | 7.00 |
| Amsco 46 Spirits | 46.00 |
| Water | 41.70 |
| Concentrate 718-C fragrance | 0.10 |
| Pine Needle Bouquet No. 921 | 0.10 |
| | 100.00 |

The composition of Example 6 was used as in Example 3 with the same results.

EXAMPLE 7

| Materials: | Weight percent |
|---|---|
| Hoechst Wax V | 0.30 |
| 3-methoxy-n-propylamine | 0.60 |
| Isostearic acid | 0.60 |
| Renex-30 | 1.75 |
| Shanco Resin (300) | 2.80 |
| Acryloid Resin (B-67) | 7.40 |
| Amsco 46 Spirits | 45.35 |
| Water | 41.00 |
| Concentrate 718-C fragrance | 0.10 |
| Pine Needle Bouquet No. 921 | 0.10 |
| | 100.00 |

The composition of Example 7 was used as in Example 1 with the same results.

I claim:

1. A cleaning and polishing composition which is an oil-in-water emulsion which inverts into a water-in-oil emulsion upon application and rubbing consisting essentially of 0.10 to 1.00 weight percent of polyvinyl octadecyl ether; 0.05 to 1.00 weight percent of diethylethanolamine; 0.15 to 2.00 weight percent of isostearic acid; 0.60 to 3.25 weight percent of polyoxyethylene-12-tridecylether; 0.10 to 5.00 weight percent of terpene-phenol resin wherein the terpene/phenol ratio is 1:1 said resin having a melting point of 150° C., an acid value of 60 and a specific gravity of 1.08 at 20° C.; 5.00 to 9.00 weight percent of a copolymer of N-tert-alkylaminoalkyl ester of acrylic and methacrylic acid wherein the alkyl groups have a total of not over 23 carbon atoms; 43.00 to 49.00 weight percent petroleum distillate which is a saturated aliphatic hydrocarbon having a minmum Kauri-Butanol value of 36; and the balance water.

2. A composition according to claim 1 wherein the ingredients are present in the following weight percentages:

| | |
|---|---|
| Polyvinyl octadecyl ether | 0.20–0.50 |
| Diethylethanolamine | 0.05–1.00 |
| Isostearic acid | 0.15–2.00 |
| Polyoxyethylene-12-tridecylether | 0.75–3.00 |
| Terpene-phenol resin | 0.50–3.00 |
| N-tert-alkylaminoalkyl ester of acrylic-methacrylic acid copolymer | 6.00–7.50 |

3. A composition according to claim 1 wherein the ingredients are present in the following weight percentages:

| | |
|---|---|
| Polyvinyl octadecyl ether | 0.20 |
| Diethylethanolamine | 0.50 |
| Isostearic acid | 0.50 |
| Polyoxyethylene-12-tridecylether | 1.50 |
| Terpene-phenol resin | 2.40 |
| N-tert-alkylaminoalkyl ester of acrylic-methacrylic acid copolymer | 7.00 |
| Petroleum distillate | 46.00 |

The balance water.

4. A cleaning and polishing composition which is an oil-in-water emulsion which inverts into a water-in-oil emulsion upon application and rubbing consisting essentially of the following ingredients, in the following weight by percentages:

| | |
|---|---|
| Polyvinyl ocetadecyl ether | 0.20 |
| Morpholine | 0.50 |
| Oleic acid | 0.50 |
| Polyoxyethylene-12-tridecylether | 1.50 |
| Terpene-phenol resin | 2.40 |
| N-tert-alkylaminoalkyl ester of acrylic-methacrylic acid copolymer | 7.00 |
| Petroleum distillate | 46.00 |
| Fragrance | 0.20 |

The balance water.

References Cited

UNITED STATES PATENTS

| | | | |
|---|---|---|---|
| 2,566,716 | 9/1951 | Boe et al. | 260—17 |
| 3,071,479 | 1/1963 | Fulenwider | 106—10 |
| 3,219,611 | 11/1965 | Witwer | 260—29.6 |
| 3,248,352 | 4/1966 | Marascia et al. | 260—28.5 |
| 3,249,592 | 5/1966 | Blades et al. | 260—78.5 |
| 3,253,941 | 5/1966 | Finn et al. | 117—6 |
| 3,296,167 | 1/1967 | Turner et al. | 260—29.6 |
| 3,306,866 | 2/1967 | Percival et al. | 260—22 |
| 3,393,078 | 7/1968 | Lockhart et al. | 106—8 |
| 3,395,028 | 7/1968 | Mackles | 106—8 |
| 3,417,041 | 12/1968 | Brown et al. | 260—28.5 |

DONALD E. CZAJA, Primary Examiner

R. A. WHITE, Assistant Examiner

U.S. Cl. X.R.

106—8; 260—18, 28.5, 29.2, 29.6, 33.6